United States Patent [19]

Kadota

[11] Patent Number: 5,305,723
[45] Date of Patent: Apr. 26, 1994

[54] CONTROL APPARATUS FOR INTERNAL COMBUSTION ENGINE

[75] Inventor: Youichi Kadota, Himeji, Japan

[73] Assignee: Mitsubishi Denki Kabushiki Kaisha, Tokyo, Japan

[21] Appl. No.: 111,494

[22] Filed: Aug. 25, 1993

[30] Foreign Application Priority Data

Aug. 27, 1992 [JP] Japan .................. 4-228469

[51] Int. Cl.⁵ .......................................... F02D 41/22
[52] U.S. Cl. ................................................ 123/479
[58] Field of Search ............... 123/479, 480, 488, 494, 123/630, 688, 425, 435; 364/431.03, 431.05, 431.11

[56] References Cited

U.S. PATENT DOCUMENTS

| | | | |
|---|---|---|---|
| 4,450,812 | 5/1984 | Otsuka et al. | 123/479 X |
| 4,615,321 | 10/1986 | Haefner et al. | 123/479 |
| 4,821,194 | 4/1989 | Kawamura | 123/479 X |
| 5,005,549 | 4/1991 | Pernpeintner et al. | 123/479 |
| 5,153,835 | 10/1992 | Hashimoto et al. | 123/479 X |
| 5,255,655 | 10/1993 | Denz et al. | 123/479 |

Primary Examiner—Willis R. Wolfe
Attorney, Agent, or Firm—Sughrue, Mion, Zinn, Macpeak & Seas

[57] ABSTRACT

In control apparatus for an internal combustion engine which includes a plurality of sensors for detecting parameters representing operation state of the engine to thereby output respective sensor signals, a crank angle sensor for generating a reference period signal in synchronism with rotation of the engine, a fuel injector for injecting fuel in the engine and an air-fuel ratio controller for determining a driving time of the fuel injector on the basis of one of the sensor signals and the reference period signal includes a filter for filtering the one sensor signal, a decision means for making decision as to normality or abnormality of the one sensor signal, and a means responsive to the decision of abnormality of the one sensor signal for thereby determining the driving time on the basis of another sensor signal and a means responsive to restoration of the one sensor signal to the normal state to thereby enable the determination of the injector driving time based on the one sensor signal to be resumed only after lapse of a first delay time from the restoration of the one sensor signal to the normal state. The driving time can be corrected by taking into account the temperature of the engine cooling water.

6 Claims, 5 Drawing Sheets

CONTROL APPARATUS FOR INTERNAL COMBUSTION ENGINE

BACKGROUND OF THE INVENTION

1. Field of the Invention

The present invention generally relates to a control apparatus for an internal combustion engine (hereinafter also referred to as the engine) of a motor vehicle for controlling optimally the air-fuel ratio of a fuel mixture supplied to the engine in dependence on engine operation state indicated by at least one sensor signal which undergoes filter processing. More particularly, the invention is concerned with an engine control apparatus capable of preventing output torque of the engine from lowering due to erroneous detection of the engine operation state which may occur upon restoration of the sensor signal to a normal level from abnormality suffering state.

2. Description of the Related Art

For a better understanding of the present invention, description will first be made in some detail of the background techniques.

FIG. 3 is a diagram showing schematically a structure of a conventional engine control apparatus together with an engine body. Referring to the figure, an internal combustion engine 1 including a plurality of cylinders (four cylinders in the case of the illustrated example) is equipped with an intake pipe 2 for supplying a fuel-containing mixture gas to the engine 1 and an exhaust pipe 3 for discharging an exhaust gas resulting from combustion of the fuel mixture within the engine cylinders.

An air flow sensor 4 is installed in the intake pipe 2 at an upstream side thereof. This sensor 4 may be constituted by a Kármán vortex type sensor which generates a pulse-like signal Q indicative of an intake air flow rate. A throttle valve 5 is mounted in the pipe 2 at a position downstream of the air flow sensor 4 for controlling the intake air flow in dependence on depression of an accelerator pedal (not shown). A throttle sensor 6 is provided in association with the throttle valve 5 for detecting the opening degree thereof. Fuel injectors 7 are also mounted in an intake manifold in the vicinity of the engine cylinders for injecting fuel into the individual cylinders. A water temperature sensor 8 is provided for detecting the temperature K of a cooling water of the engine 1.

A signal representing the opening degree $\phi$ of the throttle valve 5 which corresponds to a torque command issued by the driver is generated by the throttle sensor 6 and used in the processing for determining the accelerating state of the engine. Further, the throttle sensor signal can be utilized for determining the fuel injection quantity in place of the intake air flow signal Q when a fault occurs in the air flow sensor 4, as will be described hereinafter, because the throttle opening degree $\phi$ bears a certain correlation to the intake air flow Q.

At this juncture, it should be mentioned that in addition to the above sensors 4, 6 and 8 destined for detecting the engine operation state parameters Q, $\phi$ and K mentioned above, there are provided other various sensors for detecting other parameters indicative of the engine operation state. Accordingly, it should be understood that the phrase "sensor means" as used herein covers the other various sensors as well although they are omitted from illustration for simplification.

A crank angle sensor 9 is provided in association with a crank shaft of the engine 1 for generating a pulselike reference period signal $\theta$ in synchronism with rotation (rpm) of the crank shaft and hence that of the engine 1. The reference period signal $\theta$ represents crank angular positions which serve as references for the various engine controls inclusive of the fuel injection control, ignition timing control and others of the engine 1. Besides, a signal Ne representing the engine speed (rpm) can be derived from the reference period signal $\theta$.

An air-fuel ratio controller 10 is incorporated in an engine control unit (ECU) which may be constituted by a microcomputer and serves for determining a fuel injection amount, i.e., a driving time or duration Ti of the fuel injectors 7 on the basis of the various sensor signals and the reference period signal $\theta$ to thereby generate a command signal J corresponding to the driving time Ti for controlling the fuel injector 7.

The air-fuel ratio controller 10 includes a decision means for making decision as to normality or abnormality of the sensor signals and a filter means for filtering at least one of the sensor signals indicative of the engine operation state (e.g. the intake air flow signal Q and/or the water temperature signal K) and serves to decide whether or not the one sensor signal (e.g. the intake air flow signal Q) is normal to thereby determine the driving duration or time Ti of the fuel injectors on the basis of other engine operation state signal (e.g. the throttle opening degree signal $\phi$) when the one sensor signal is abnormal while determining the driving time Ti on the basis of the above-mentioned one sensor signal (i.e., the intake air flow signal Q) upon restoration thereof to the normal state or level.

The signals produced by the various sensors and representing the engine operation state are ordinarily subjected to the filtering or filter processing in the air-fuel ratio controller 10 for the purpose of eliminating noise components superposed on the sensor signals due to turn-on/off of various switches. In this conjunction, it is noted that the intake air flow signal Q outputted from the air flow sensor 4 mounted in the intake pipe 2 takes a relatively long time for rising up to the normal level which reflects the amount of intake air supplied actually to the engine 1. For this reason, the air intake flow signal Q undergoes the filter processing with a large time constant, whereby an intake air flow data signal A which can be used for determining the injector driving time Ti is ultimately derived. Similarly, the output signal of the water temperature sensor 8 undergoes the filter processing with a large time constant since the water temperature K is usually controlled to be constant at 80° C. and less susceptible to abrupt change.

As mentioned previously, the air-fuel ratio controller 10 is incorporated in the computer-based engine control unit which is in charge of overall engine control and serves for the control of the air-fuel ratio on the basis of the sensor signal(s) and the reference period signal $\theta$.

FIG. 4 is a timing chart of the reference period signal $\theta$ and the command signal J. As can be seen in the figure, the reference period signal $\theta$ is of a pulse-like waveform and has a period of 180° in terms of the crank angle, wherein the trailing or falling edge of the pulse is used as a reference for the fuel injection timing. In the case of the illustrated engine system, the fuel injectors 7 for all the cylinders are simultaneously driven at every crank angle of 360° (upon every complete rotation of the crank shaft 1). The individual sensor signals are fetched at the falling timing $t_{11}$; $t_{12}$ of the reference period pulse signal $\theta$, whereby the fuel injectors 7 are actuated for the driving time or period $T_i(1)$; $T_i(2)$.

FIGS. 5 and 6 are views illustrating maps which are incorporated in the air-fuel ratio controller to be referenced in determining the amount to fuel to be injected. To this end, desired or target air-fuel ratios (e.g. 14.7, etc.) are contained in these maps as the data representing corresponding fuel amounts or quantities.

More specifically, FIG. 5 shows a fuel quantity map containing the air fuel ratios. This map is previously prepared on the basis of the engine speed Ne (rpm) derived from the reference period signal $\theta$ and the intake air flow data A derived from the intake air flow sensor signal Q, wherein the fuel quantities corresponding to the air-fuel ratios in two-dimensionally arrayed areas of the map are selectively determined in accordance with a function given generally in the form of f(Ne, A).

The fuel mixture having the density represented by the air-fuel ratio and injected through the injectors 7 during the driving time Ti is so controlled as to become lean as the engine speed Ne (rpm) increases and become rich as the intake air flow A increases, as can be seen from FIG. 5.

On the other hand, FIG. 6 shows a fuel map which is prepared on the basis of the engine speed Ne (rpm) and the throttle opening degree $\phi$ which can represent indirectly the intake air flow A. This map is used when the intake air flow signal Q suffers abnormality, wherein the fuel quantity corresponding to each of the air-fuel ratios stored in the two-dimensionally arrayed areas of the map is selectively determined in accordance with a function generally given in the form of f(Ne, $\phi$).

Next, description will turn to the air-fuel ratio control operation of the conventional engine control apparatus by referring to FIGS. 3 to 6 together with a timing chart shown in FIG. 7.

Usually, the pulse-like intake air flow signal Q indicative of the intake air flow rate is outputted from the air flow sensor 4 so far as it operates normally. This intake air flow signal Q undergoes the filter processing in the fuel-air ratio controller 10, whereby the intake air flow data signal A is generated. On the basis of this intake air flow data A and the engine rotation speed Ne, a reference fuel quantity corresponding to a desired or target air-fuel ratio is determined in accordance with the function f(Ne, A) by referencing the map shown in FIG. 5. A command signal J is then generated on the basis of the reference fuel quantity by the air-fuel ratio controller 10 and applied to the fuel injectors 7. In this manner, the fuel injection can be controlled in dependence on the operation state of the engine.

More specifically, the operation state of the engine 1 is detected at a time point corresponding to the falling edge of the reference period pulse signal $\theta$ at every complete rotation of the crank shaft. A the same time, it is decided whether the intake air flow signal Q of the air flow sensor 4 and the water temperature signal K of the water temperature sensor 8 are normal. When these signals Q and K are normal, the injector driving time Ti is calculated in the manner described above, whereby the command pulse signal J having the pulse width or duration corresponding to the injector driving time T is generated.

At that time, the injector driving time Ti, i.e., the pulse width of the command signal J, is determined in accordance with the following expression (1):

$$Ti = f(Ne, A) \times Gi \times Kw + Td \qquad (1)$$

where f(Ne, A) represents the reference fuel quantity for realizing the desired air-fuel ratio as a function of the rotation speed Ne of the engine and the intake air flow data A. Assuming, by way of example, that the engine speed Ne is 3000 rpm, the intake air flow data A is 2 g/cylinder, and that the target air-fuel ration is 15.0, the reference fuel amount of 2/15 ($\times$0.133 g) is set as the map data shown in FIG. 5. Further, in the above-mentioned expression (1), Gi represents a gain for the driving time of fuel injector 7, which gain Gi is used for calculating the injector driving time Ti required for injecting the reference fuel quantity determined from the map data f(Ne, A). Furthermore, Kw represents a correcting coefficient for the water temperature signal K. This correcting coefficient Kw is set at a large value when the water temperature K is low. This is because carburetion susceptibility of the fuel is poor when the water temperature K is low, as in the case of the engine warming operation, and thus it is required to increase the fuel supply to ensure a sufficient amount of the fuel which contributes to combustion within the engine cylinders even in the engine operation state where the water temperature K is low. Finally, Td represents a dead time intervening between the reception of the command signal J and the actual start of the fuel injection. The dead time T depends on the battery voltage.

As will be apparent from the above description, the fuel injector driving time Ti is calculated in accordance with the expression (1) so long as the air flow sensor is normal.

On the other hand, when the intake air flow signal Q is at an abnormal level or unavailable from the air flow sensor 4 due to a fault (such as contact failure), the air-fuel ratio controller 10 decides abnormality of the intake air flow signal Q and calculates the injector driving time Ti in accordance with the undermentioned expression (2) by referencing the map data f(Ne, $\phi$) which is prepared on the basis of the throttle opening degree $\phi$ as shown in FIG. 6.

$$Ti = f(Ne, \phi) \times Gi \times Kw + Td \qquad (2)$$

At this juncture, it should be mentioned that although the throttle opening degree $\phi$ can not represent the intake air flow rate with a high fidelity when compared with the output signal of the air flow sensor 4, the throttle opening degree can adequately be utilized as the back-up data replacing the intake air flow data A. Further, since the throttle opening degree signal $\phi$ is not subjected to the filter processing with a large time constant, there arises practically no problem when the input data to the air-fuel ratio controller 10 is changed over to the throttle opening degree signal $\phi$ from the intake air flow data A immediately upon detection of occurrence of abnormality in the latter.

In this conjunction, it is further to be noted that when the intake air flow signal Q resumes the normal level due to, for example, restoration of the contact from the disconnected state in the air flow sensor 4 at a time point $t_1$ shown in FIG. 7, the air-fuel ratio controller 10 decides that the intake air flow signal Q is normal and calculates the fuel injector driving time Ti on the basis of the intake air flow data A in accordance with the expression (1).

However, it is at a time point $t_2$ that the intake air flow data signal A resulting from the filter processing reaches a normal value or level $A_o$ corresponding to the actual intake air flow signal Q, as shown in FIG. 7. Consequently, during a period extending from the time point $t_1$ to $t_2$ after restoration of the air-flow sensor to the normal state, the driving time $T_1$ is calculated in accordance with the expression (1) by referencing the map data shown in FIG. 5 on the basis of the intake air flow data A which assumes a lower value than the normal level $A_o$ indicating the actual intake air flow rate. As a result of this, the target air-fuel ratio is set to a value corresponding to a lean fuel gas mixture, which means that the fuel injector driving time Ti becomes shorter as shown in FIG. 7, lowering the engine rotation speed Ne and the output torque, giving rise to a problem. In this case, if the engine is in the idling state with an inherently low output torque, the engine stoppage may take place in the worst case.

On the other hand, unless the water temperature signal K is obtained from the water temperature sensor 8, the air-fuel ratio controller 10 decides abnormality of the water temperature sensor 8 and corrects the fuel injector driving time Ti in accordance with the undermentioned expression (3) by using a predetermined correction coefficient Kw(80) for a predetermined water temperature of 80° C. in place of the correcting coefficient Kw corresponding to the actual water temperature K.

$$Ti \times f(Ne, A) \times Gi \times Kw(80) + Td \qquad (3)$$

In the above expression, the predetermined correcting coefficient Kw(80) is employed in place of the coefficient Kw in the expression (1). It goes however without saying that the coefficient Kw(80) may equally be used in the expression (2) as well. In this manner, when the water temperature sensor 8 is decided as suffering from a fault, the fuel injector driving time Ti is calculated in accordance with the expression (3). However, when the water temperature sensor signal is restored to the normal level, the fuel injector driving time Ti is then calculated in accordance with the expression (1) by using the correcting coefficient Kw. In that case, however, a time lag is involved in the restoration of the water temperature signal K to the normal level due to the filter processing, as mentioned hereinbefore, which results in intervention of a time lag in optimizing the fuel injector driving time Ti, to a disadvantage.

As is apparent from the foregoing description, in the case of the conventional fuel injection control system described above, the sensor signals are used as the control information by the air-fuel ratio controller 10 immediately when they are restored to the normal level, incurring a time lag in realizing the optimal driving time Ti for the fuel injectors due to incorrect detection of the engine operation state, giving rise to a problem that the engine output torque is undesirably lowered.

SUMMARY OF THE INVENTION

In the light of the state of the art described above, it is an object of the present invention to provide a control apparatus for an internal combustion engine, which apparatus is capable of preventing an engine output torque from lowering due to erroneous detection of the sensor signal(s) upon restoration thereof to the normal level through the filter processing.

In view of the above and other objects which will become apparent as description proceeds, there is provided according to a general aspect of the present invention a control apparatus for an internal combustion engine, which apparatus comprises a plurality of sensor means for detecting parameters representing operation state of the engine to thereby output respective sensor signals, a crank angle sensor means for generating a reference period signal in synchronism with rotation of the engine, a fuel injector means for injecting fuel into the engine, and an air-fuel ratio control means for determining a driving time of the fuel injector means on the basis of at least one of the sensor signals and the above-mentioned reference period signal. The air-fuel ratio control means includes a filter means for filtering the one sensor signal mentioned above, a decision means for making decision as to normality or abnormality of the one sensor signal, a means responsive to the decision of abnormality of the one sensor signal for thereby determining the driving time of the fuel injector means on the basis of another one of the sensor signals, and a means responsive to restoration of the one sensor signal to the normal state thereof to thereby allow the determination of the injector driving time based on the one sensor signal to be resumed only after lapse of a first predetermined delay time from the restoration of the one sensor signal to the normal state.

With the arrangement of the engine control apparatus described above, when the sensor signal playing a role in determination of the fuel injector driving time undergoes the filter processing, determination of the fuel injector driving time on the basis of a given sensor signal is resumed only after lapse of a predetermined delay time from the restoration of the given sensor signal to the normal state, whereby the problems mentioned hereinbefore can be overcome.

In a preferred mode for carrying out the invention, the one sensor signal may be an intake air flow signal, and the other sensor signal may be a throttle opening degree signal.

In another preferred mode for carrying out the invention in which the sensor means include a water temperature sensor for outputting a signal indicative of temperature of engine cooling water, the air-fuel ratio control means includes a driving time determining means for determining the driving time of the fuel injector means on the basis of either one of the aforementioned one sensor signal or the aforementioned another sensor signal and the reference period signal, a filter means for filtering the water temperature sensor signal, a driving time correcting means for correcting the driving time with a correcting coefficient corresponding to the water temperature when the water temperature sensor signal is normal, while correcting the driving time with a predetermined correcting coefficient when the water temperature sensor signal is abnormal, and a means responsive to restoration of the water temperature sensor signal to a normal state to thereby allow the correction of the driving time based on the correcting coefficient corresponding to the water temperature only after lapse of a second predetermined delay time.

With the arrangement of the engine control apparatus described above, when abnormality is found in the water temperature signal which partakes in correcting the fuel injector driving time, a fixed correction of the injector driving time is performed by using a predetermined correcting coefficient, while upon restoration of the water temperature signal to the normal level, the correction of the injector driving time is performed by using the restored water temperature signal only after lapse of the second delay time which corresponds to the filter processing of the water temperature signal.

Thus, according to the teachings of the invention, the shortcomings of the hitherto known engine control apparatus can satisfactorily be solved.

These and other features and advantages of the present invention will become apparent to those skilled in the art upon reading of the following detailed description of the preferred embodiments taken in conjunction with the drawings.

DESCRIPTION OF THE PREFERRED EMBODIMENTS

Now, the present invention will be described in detail in conjunction with preferred or exemplary embodiments by reference to the drawings.

Figure 1:
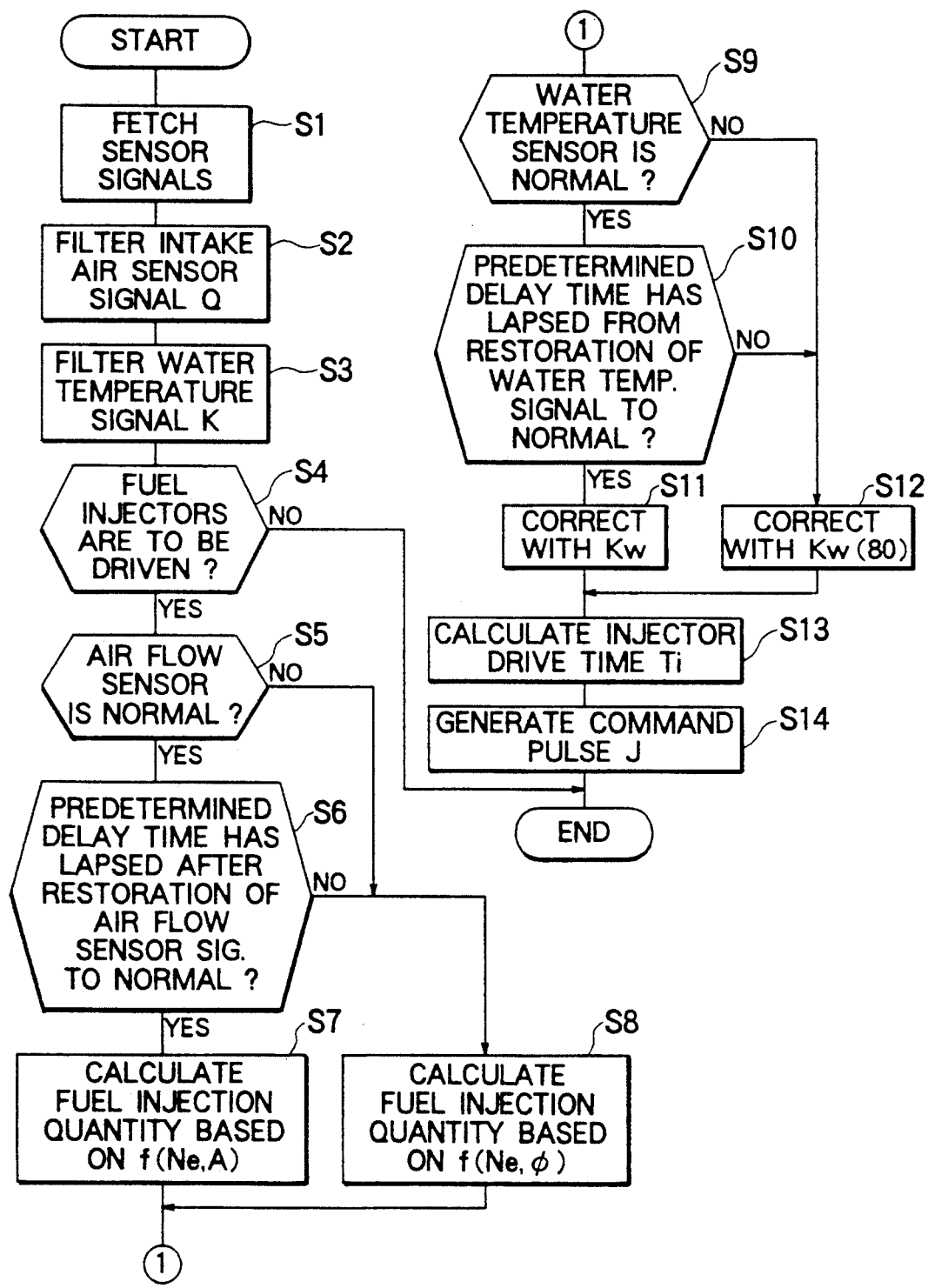
FIG. 1 is a flow chart for illustrating operation of an air-fuel ratio controller according to an embodiment of the invention.
Figure 2:
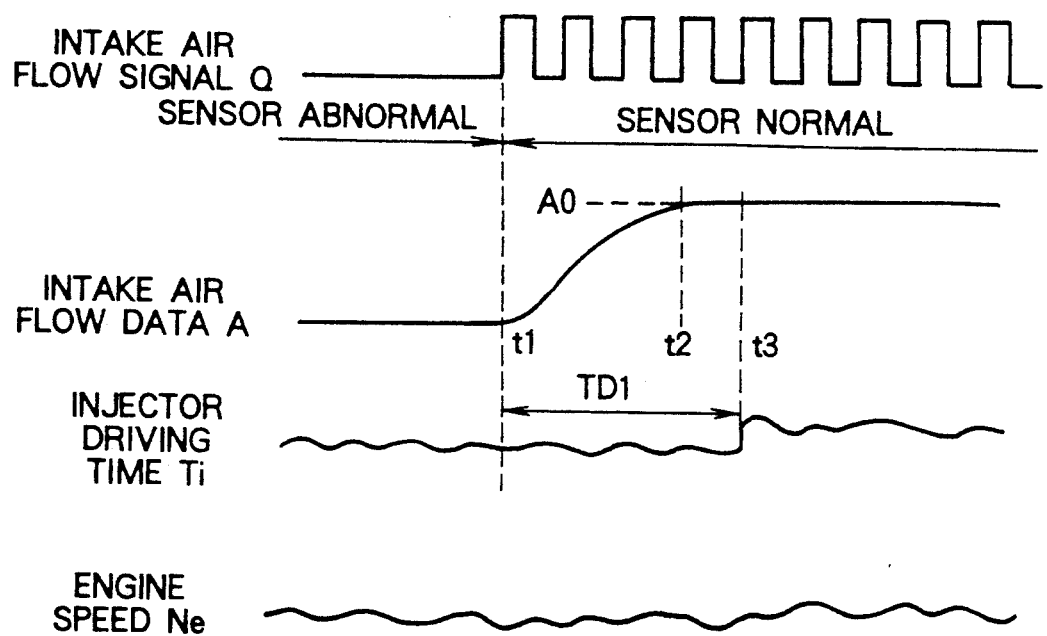
FIG. 2 is a timing chart for illustrating the concept of the invention incarnated in the air-fuel ratio controller shown in FIG. 1.
Figure 3:
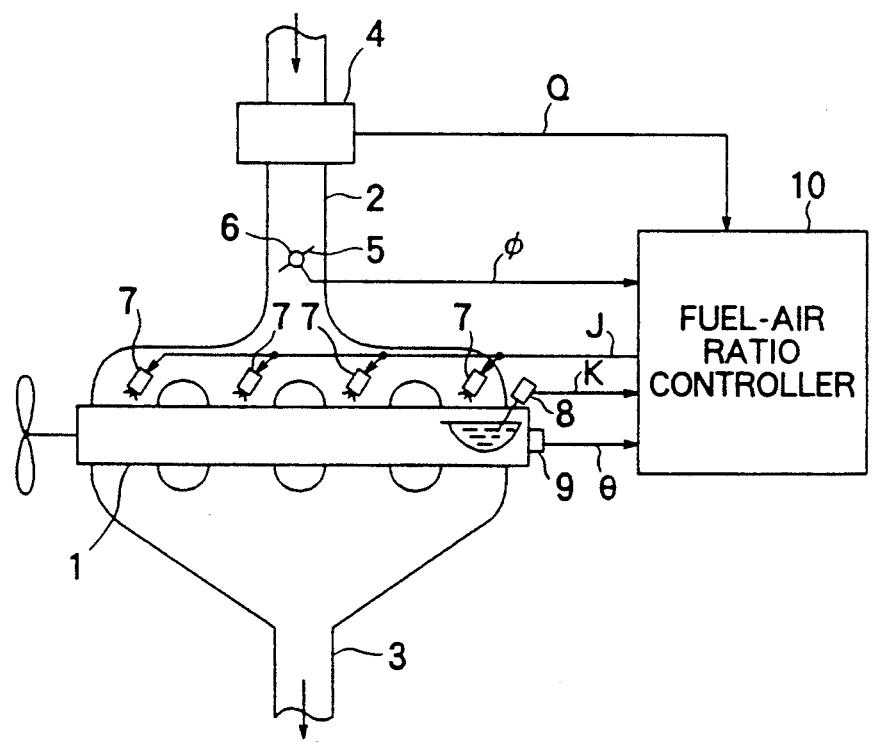
FIG. 3 is a diagram showing schematically a structure of an engine control apparatus to which the invention can be applied.
Figure 4:
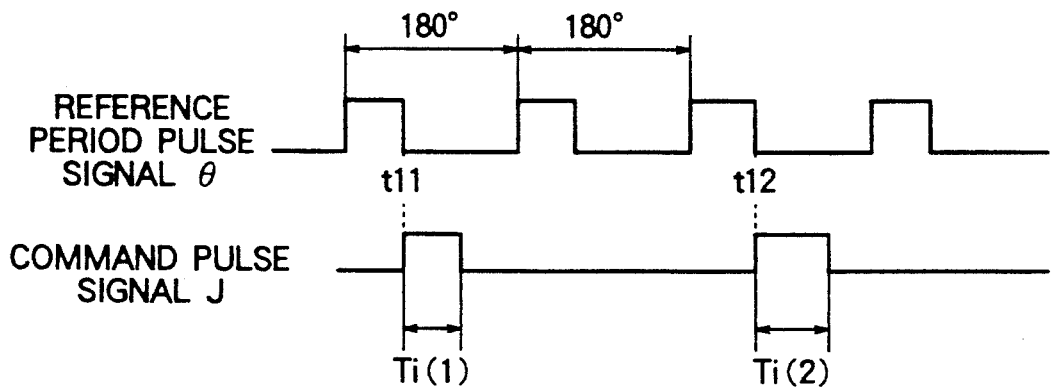
FIG. 4 is a timing chart showing a reference period signal ($\theta$) and a command signal (J)
Figure 5:
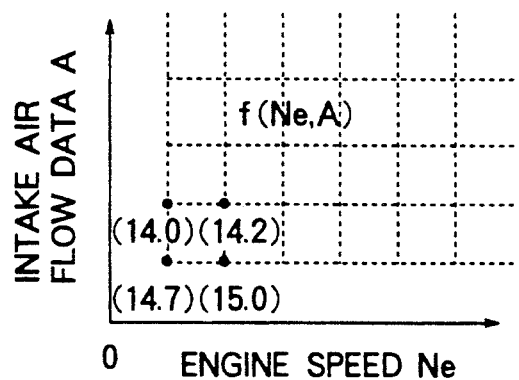
FIG. 5 is a view illustrating a map which is incorporated in an air-fuel ratio controller and referenced in determining the amount of fuel to be injected in the engine.
Figure 6:
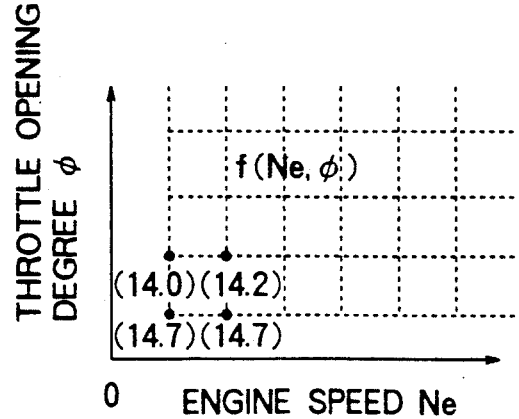
FIG. 6 shows a fuel injection map prepared on the basis of engine speed (Ne) and throttle opening degree ($\phi$)
Figure 7:
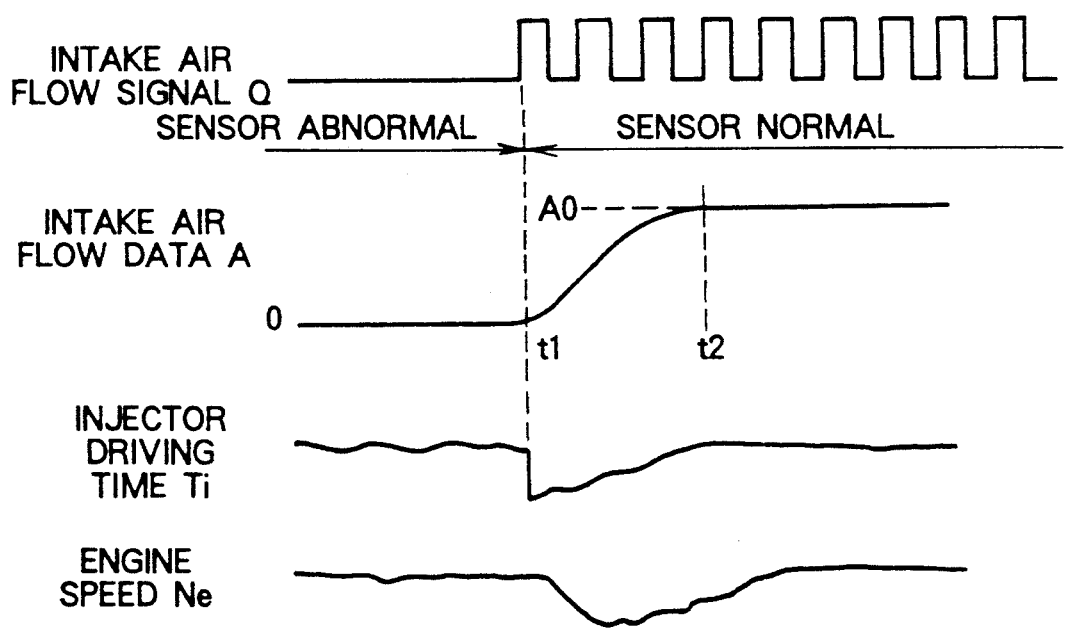
FIG. 7 is a timing chart for illustrating operation of a conventional air-fuel ratio controller in determining the fuel injector driving time.

FIG. 1 is a flow chart for illustrating operation of an air-fuel ratio controller according to an embodiment of the invention, and FIG. 2 is a timing chart for illustrating the concept of the invention incarnated in the air-fuel ratio controller. It has first to be mentioned that the structure and the ordinary control operation of the engine control apparatus to which the invention is applied is same as those described hereinbefore by reference to FIGS. 3 to 6 and that the processing routine shown in the flow chart of FIG. 1 is executed at the falling edge of the reference period signal $\theta$.

The air-fuel ratio controller 10 has a function for enabling again or restoring the determination of the fuel injector driving time Ti on the basis of the intake air flow sensor signal upon lapse of a first delay time after the intake air flow sensor signal Q once suffered abnormality has been restored to the normal state, and a function for restoring correction of the fuel injector driving time Ti on the basis of the correcting coefficient Kw upon lapse of a second delay time after the water temperature signal K contributing to correction of the driving time Ti has been restored to the normal state.

Now, referring to FIG. 1, the air-fuel ratio control means 10 fetches the sensor signals such as the intake air flow signal Q, the water temperature signal K, the reference period signal $\theta$, etc., at the timing corresponding to the falling edge of the reference period signal $\theta$ (step S1). In a step S2, the intake air flow signal Q undergoes a filtering or filter processing to obtain the intake air flow data A. In a step S3, the water temperature signal K is subjected to a filter processing.

Subsequently, in a step S4, it is decided whether the fuel injector 7 is to be driven at the time point corresponding to the current falling edge of the reference period signal $\theta$. When the decision step S4 results in negation (NO), the processing routine under consideration is ended. If otherwise, an abnormality decision means incorporated in the air-fuel ratio controller 10 makes decision on the basis of the fetched intake air flow signal Q as to whether or not the air flow sensor 7 operates normally (step S5), which is then followed by a step S6 where decision is made as to whether a predetermined time (the first delay time) TD1 has lapsed from the time point at which the air flow sensor 7 was restored to the normal operation state (i.e., whether the air flow sensor 7 has been normal at least for the predetermined time TD1, to say in another way). If the answer of this step S6 is affirmative, the amount of fuel to be injected into the engine is calculated by referencing the map data f(Ne, A) prepared on the basis of the intake air flow data A in a step S7.

Referring to FIG. 2, the first delay time TD1 extending from the time point $t_1$ at which the air flow sensor was restored to the normal state to a time point $t_3$ is selected to be longer than a time required for the intake air flow data signal A undergoing the filtering processing to rise up (a time from the time point $t_1$ to $t_2$). Consequently, the intake air flow data signal A attains the level $A_o$ indicated by the pulses of the intake air flow signal Q at the time point $t_3$. Thus, it is possible to determine accurately the fuel injection quantity on the basis of the map data f(Ne, A).

On the other hand, when it is decided in the step S5 that the air flow sensor 7 suffers abnormality or when decision is made in the step S6 that the predetermined time TD1 has not lapsed yet from the restoration of normal operation of the air flow sensor, the fuel injection quantity is calculated by referencing the map data f(Ne, $\phi$) prepared on the basis of the throttle opening degree $\phi$ in a step S8.

In this manner, erroneous determination of the fuel injection quantity due to erroneous detection of the intake air flow data A can be prevented by providing the first delay time TD1, whereby the engine speed Ne (rpm) can be stabilized upon restoration of the air flow sensor to the normal state.

However, the injector driving time Ti determining the fuel injection quantity may be corrected with the correcting coefficient Kw which depends on the water temperature K, as described hereinbefore in conjunction with the expressions (1) and (3). Accordingly, it is desirable to perform the similar processing upon restoration of the water temperature sensor 8 to the normal state from the state in which the sensor 8 suffers abnormality.

Accordingly, in a succeeding step S9, decision is made whether the water temperature sensor 8 is normal by checking the value of the water temperature signal K. When it operates normally, it is then checked in a step S10 whether a second predetermined time (second delay time) has lapsed from the time point at which the water temperature sensor resumed the normal state. In this conjunction, the second predetermined time (second delay time) is so set as to be longer than a time taken for the water temperature signal K to reach the inherent normal level through the filtering processing. When the decision step S1O results in affirmation (YES), the fuel injection driving time TD1 is corrected with the correcting coefficient Kw corresponding to the water temperature K as fetched in a step S11. On the other hand, if the water temperature sensor is not restored to the normal state or the predetermined time (second delay time) has not lapsed from the restoration of the sensor to the normal state, the fuel injector driving time TD1 is corrected with the correcting coefficient Kw(80) determined previously for the water temperature of 80° C.

In this way, erroneous detection of the water temperature K is prevented, whereby the reliability of correction of the driving time TD1 with the water temperature can be enhanced.

As is apparent from the foregoing description, according to the teachings of the invention incarnated in the illustrated embodiment, the fuel injector driving time or period TD1 is first determined on the basis of the engine speed Ne and the intake air flow A or the throttle opening $\phi$ and then corrected with the correcting coefficient Kw corresponding to the water temperature K or alternatively with the predetermined correcting coefficient Kw(80), as shown in the expressions (1) to (3) mentioned hereinbefore, whereby the injector driving time Ti is ultimately determined with high accuracy (step S13).

Finally, in a steps S14, the command pulse signal J having a pulse width or duration corresponding to the injector driving time Ti is generated to drive the injectors 7, whereupon the routine comes to an end.

Many features and advantages of the present invention are apparent from the detailed description and thus it is intended by the appended claims to cover all such features and advantages of the system which fall within the true spirit and scope of the invention. Further, numerous modifications and changes will readily occur to those skilled in the art. Accordingly, it is not desired to limit the invention to the exact construction and operation illustrated and described.

By way of example, in the case of the illustrated embodiment, it has been described that the fuel injection driving time determined on the basis of the intake air flow or the throttle opening degree is corrected with the correcting coefficient Kw or Kw(80) based on the water temperature. However, since such correction plays only an auxiliary role in determining the desired fuel injector driving time or period, the object of the present invention can be accomplished even when the above-mentioned correction processing is omitted.

Further, although the intake air flow signal Q is employed as the engine operation state signal in determining the injector driving time Ti for controlling the air-fuel ratio when the air flow sensor is normal while the throttle opening signal $\phi$ is employed for the same purpose when the air flow sensor suffers abnormality, it goes without saying that other engine operation state signal may be employed to the substantially same effect, so far as it undergoes the filter processing.

In the foregoing description, it has been assumed that the injectors 7 are simultaneously driven to inject the fuel into the engine. However, the invention can equally be applied to the engine in which the injectors 7 provided in association with the individual cylinders are driven sequentially, so long as the fuel injectors are of the type in which the driving time thereof is controlled with reference to the falling timing of the reference period signal $\phi$.

Thus, all suitable modifications and equivalents may be resorted to, falling within the scope of the invention.

I claim:

1. A control apparatus for an internal combustion engine, comprising:

a plurality of sensor means for detecting parameters representing operation state of said engine to thereby output respective sensor signals;

crank angle sensor means for generating a reference period signal in synchronism with rotation of said engine;

fuel injector means for injecting fuel into said engine; and air-fuel ratio control means for determining a driving time of said fuel injector means on the basis of at least one of said sensor signals and said reference period signal;

wherein said air-fuel ratio control means includes:

filter means for filtering said one sensor signal;

decision means for making decision as to normality or abnormality of said one sensor signal;

means responsive to the decision of abnormality of said one sensor signal for thereby determining said driving time of said fuel injector means on the basis of another one of said sensor signals; and means responsive to restoration of said one sensor signal to the normal state thereof to thereby allow the determination of said injector driving time based on said one sensor signal to be resumed only after lapse of a first predetermined delay time from the restoration of said one sensor signal to the normal state.

2. An engine control apparatus according to claim 1, wherein said one sensor signal represents an intake air flow of said engine, and said another sensor signal represents an opening degree of a throttle valve of said engine.

3. An engine control apparatus according to claim 1, wherein said first delay time is selected longer than a time taken for said one sensor signal to undergo the filtering.

4. An engine control apparatus according to claim 1, wherein said sensor means include a water temperature sensor for outputting a signal indicative of temperature of engine cooling water;

said air-fuel ratio control means includes:

driving time determining means for determining said driving time of said fuel injector means on the basis of either one of said one sensor signal or alternatively said another sensor signal and said reference period signal;

filter means for filtering said water temperature sensor signal;

driving time correcting means for correcting said injector driving time with a correcting coefficient corresponding to the water temperature when said water temperature sensor signal is normal, while correcting said injector driving time with a predetermined correcting coefficient when said water temperature sensor signal is abnormal; and means responsive to restoration of said water temperature sensor signal to a normal state to thereby allow the correction of said driving time based on said correcting coefficient corresponding to said water temperature only after lapse of a second predetermined delay time from restoration of said water temperature sensor signal to the normal state.

5. An engine control apparatus according to claim 4, wherein said second predetermined delay time is selected longer than a time taken for said water temperature sensor signal to undergo said filtering.

6. An engine control apparatus according to claim 4, wherein said one sensor signal represents an intake air flow of said engine, and said another sensor signal represents an opening degree of a throttle valve of said engine.

* * * * *